United States Patent [19]
Alfter et al.

[11] 4,377,614
[45] Mar. 22, 1983

[54] FLOOR MAT, ESPECIALLY FOR MOTOR VEHICLES

[75] Inventors: Franz-Werner Alfter; Hans-Ulrich Breitscheidel, both of Siegburg, Fed. Rep. of Germany

[73] Assignee: Dynamit Nobel Aktiengesellschaft, Troisdorf, Fed. Rep. of Germany

[21] Appl. No.: 205,253

[22] Filed: Nov. 10, 1980

[30] Foreign Application Priority Data

Nov. 9, 1979 [DE] Fed. Rep. of Germany ....... 2945285

[51] Int. Cl.³ .......................... B32B 7/02; B32B 7/04; B32B 5/18
[52] U.S. Cl. .................................... 428/213; 428/218; 428/316.6; 428/319.7
[58] Field of Search .................. 428/315, 316.6, 314.4, 428/314.8, 319.1, 319.3, 319.7, 159, 213, 218

[56] References Cited

U.S. PATENT DOCUMENTS

| | | | |
|---|---|---|---|
| 3,651,183 | 3/1972 | Hosoda et al. | 264/54 |
| 3,954,537 | 5/1976 | Alfter et al. | 428/316.6 |
| 4,020,207 | 4/1977 | Alfter et al. | 428/315 |
| 4,053,341 | 10/1977 | Kleiner et al. | 428/316.6 |
| 4,147,828 | 4/1979 | Heckel et al. | 428/315 |
| 4,259,408 | 3/1981 | Moschter | 428/315 |

Primary Examiner—William J. Van Balen
Attorney, Agent, or Firm—Antonelli, Terry & Wands

[57] ABSTRACT

A floor mat is formed essentially of cross-linked polyolefin foam for the lining of the floor interiors of motor vehicles. This mat includes a cross-linked polyolefin foam floor mat base having at least one preselected surface area covered with a permanently applied floor-protecting surface layer. The layer is made up of cross-linked polyolefin foam layer and a thermoplastic polymeric film which is heatable in a high-frequency electrical field in dielectric fashion and which exhibits wear resistance superior to the cross-linked polyolefin foam or base. The cross-linked polyolefin foam base is preshaped to conform to the contours of the floor interior of a motor vehicle.

11 Claims, 7 Drawing Figures

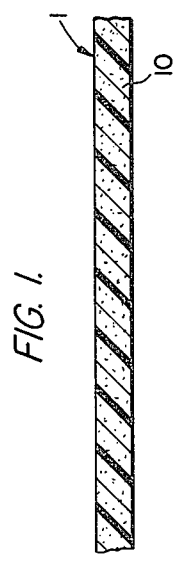
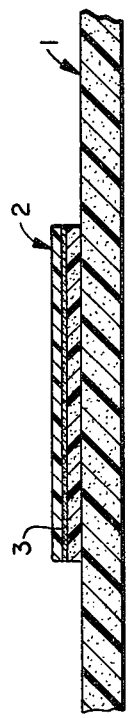
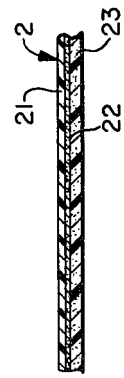
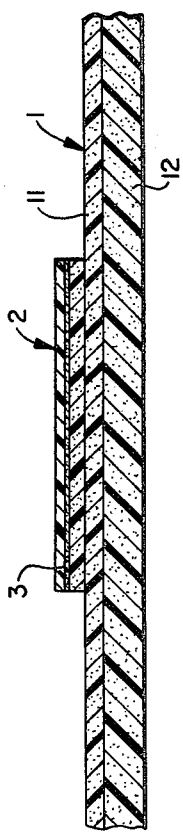
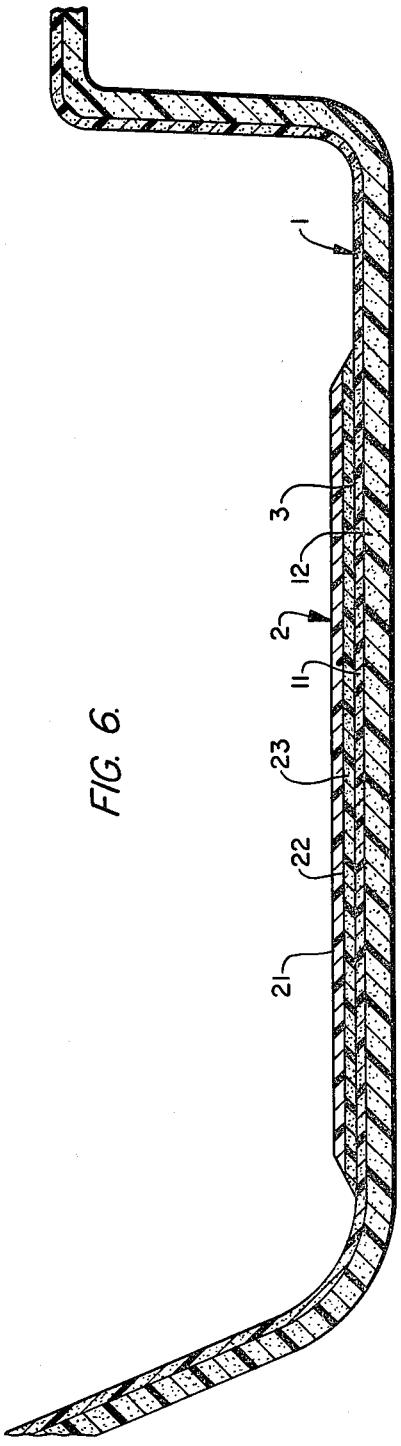

FLOOR MAT, ESPECIALLY FOR MOTOR VEHICLES

This invention relates to a floor mat of cross-linked polyolefin foam, especially for lining the interiors of motor vehicles and to a method of forming the mat.

German Offenlegungsschrift No. 2,504,691 discloses trunk and floor mats for motor vehicles or other modes of transport, shaped in the elastic or plastic state by the application of pressure and heat, from a laminated, closed-cell and preferably chemically cross-linked polyethylene foam with a density of 30 to 200 kg/m$^3$. These trunk or floor mats can be manufactured in either a single layer or multiple layers from polyethylene foam sheets with different densities, whereby the polyethylene foam sheet with the higher density provides a surface which is more resistant to wear.

It has been found that polyethylene foam mats with high densities or those laminated with polyethylene film do in fact suffice for many requirements, but such foam mats have not been able to withstand the stresses to which the mats are exposed in the floor area and pedal area of floor mats contacted by the occupants in passenger compartments of motor vehicles. Carpet linings in passenger compartments of motor vehicles that are reinforced in areas of high wear are known. For example, such areas may be reinforced by plastic pads, welded or glued in place, the surface of the pads being sometimes embossed.

The goal of the invention is to make floor mats from cross-linked polyolefin foams, which also have a wear-resistant surface in the floor area subjected to high wear. The difficulty arises that suitable floor protective coatings made of thermoplastic plastics such as PVC cannot be reliably and permanently bonded directly by welding or gluing to cross-linked polyolefin foam in floor mats. Moreover, when making a laminate of this kind, it is also necessary to keep in mind the foam structure of the floor mat, which structure should be maintained as much as possible.

The invention solves the problem of providing a floor mat of cross-linked polyolefin foam with a floor-protecting surface by providing a permanently applied covering layer made of a combination of thermoplastic plastic film, heatable in a high-frequency electrical field by dielectric heating, with a cross-linked polyolefin foam layer, which itself is not heatable by high frequency. This combination of the different materials according to the invention produces a floor mat with a wear-resistant surface that is suitable as a floor protector and that makes optimum use of the properties of the different materials. Using a thermoplastic plastic film which is dielectrically heatable in a high-frequency electric field, makes it possible to produce in an indirect fashion, by high-frequency heating, a permanent bonding of the floor-protecting surface layer with the floor mat. Preferably, films made of plastic with a dielectric constant of 2.5 to 6 and a dielectric loss factor less than $1.5 \times 10^{-3}$, especially polyvinyl chloride or soft polyvinylchloride, ABS polymers, ethylene copolymers, ethylene copolymers, or polyamides, are used.

The basic floor mat, i.e. the base portion of the total mat construction, preferably consists of a chemically cross-linked polyethylene foam sheet, made, for example, by the method described in U.S. Pat. No. 3,651,183 preferably shaped under the influence of heat and pressure to the form, i.e. to the contour, of the interior of the motor vehicle to be lined. If will be understood that the floor mat base may be flat or be shaped to have the contoured configuration which will mate with the floor interior of the motor vehilcle prior to application of the floor protective surface layer. Generally the base is shaped after application of the protective surface layer to selected surface portions or areas. If the floor mat is made in one layer from a chemically cross-linked polyethylene sheet, a foam with a density of 100 to 150 kg/m$^3$ with a thickness of 5 to 10 mm is preferably employed. This foam meets both the requirements for insulating properties and the abrasion resistance of the surface outside the floor area subjected to high wear. In addition, it is advantageous, in order to reduce the total weight of the floor mat and also for economic considerations, to make the base floor mat out of two sheets of chemically cross-linked polyethylene foam, joined flush with one another, the sheets being laminated together, whereby the polyethylene foam sheet forming the side exposed to wear has a density of 150 to 200 kg/m$^3$ and a thickness of 2 to 5 mm, while the polyethylene sheet that forms the back has a density of 30 to 70 kg/m$^3$ and is 4 to 10 mm thick.

The polyethylene foam with the higher density increases the abrasion resistance and wear resistance of the side exposed to wear, while the polyethylene foam sheet with the lower density has a sufficient cushioning and insulating effect on the lining of the interior of the motor vehicle.

An important inventive idea for the floor mat is the use of a floor-protecting layer made of a laminate, whereby the side of the floor-protecting layer to be bonded to the upper exposed surface of the floor mat is formed by a layer of the same polyolefin foam as the floor mat, which may have a different density. This permits the production of a homogeneous connection by melt welding; between the base floor mat and the floor-protecting layer, caused by the dielectric heating of the thermoplastic film of the protecting cover layer. This connection reliably prevents the floor-protecting layer from coming loose from the floor mat during use. As far, as plastic film and the polyolefin foam layer cannot be bonded directly together by heat welding, the invention provides another embodiment for this bonding.

According to another embodiment of the invention, the plastic film and the polyolefin foam layer which form the floor-protecting surface layer are bonded together by an adhesion promoter which is cross-linkable under the influence of heat. A preferred material combination provides for the use of a soft PVC film for the outer floor-protecting surface, which is flame-laminated with a chemically cross-linked polyethylene foam sheet by using an acrylic resin containing a hydroxyl group and an isocyanate-based hardener. Manufacture of a laminate of this kind is described, for example, in German Offenlegungsschrift No. 2,707,727 and U.S. patent application Ser. No. 882,904, filed Mar. 2, 1978, now U.S. Pat. No. 4,259,408, while according to the present invention this laminate can be applied to the desired floor mat as the floor-protecting surface, and worked.

Preferably, according to the invention, the polyolefin foam layer in the floor-protecting surface layer has a density of 70 to 100 kg/m$^3$ and a layer thickness of 2 to 5 mm.

In another embodiment of the invention, a lattice-shaped or coarse-mesh reinforcing layer, especially a layer of fiberglass or polyester fibers, is provided between the floor mat base and the floor-protecting layer to increase the wear resistance and stability.

In a modification of the invention it is also possible to provide additionally between the basic floor mat and the floor-protecting surface layer an auxiliary welding film heatable by high frequency, especially one made of a melted adhesive or an ethylene vinyl acetate copolymer film containing 8 to 60% acetate.

The method according to the invention for manufacturing the floor mat with a floor-protecting surface layer uses the heat produced by a high frequency field in the plastic film of the protecting layer, and this heat of the plastic film indirectly, heats the polyolefin foam beneath by heat transfer and consequently the polyolefin foam being heated up by this heat transfer starts to melt and to produce a welded bond. One procedure according to the invention involves heating the polyolefin foam sheet forming the floor mat to a temperature between 120° and 160° C., and shaping the floor mat to the desired form by using a vacuum or high pressure, whereupon the floor-protecting surface layer is applied with its foam side contacting the initially formed mat and exposed to a high-frequency field in this form in such manner that the plastic film of the floor-protecting surface layer is heated by the high-frequency field and heat is transferred by the heated plastic film to the polyolefin foam associated therewith, whereupon the surfaces of the polyolefin foam layer of the floor-protecting surface layer and the polyolefin foam sheet of the floor mat base melt together and are welded. As far as the bond or connection between the floor-protecting surface layer and the floor mat is concerned, it is especially important for the bond of the plastic film and the polyolefin foam of the floor protecting surface layer not to be separated by heating in a high-frequency electrical field.

Another process for manufacturing a floor mat with a floor-protecting surface layer according to the invention provides for applying the floor-protecting surface layer with its foam side on the polyolefin foam sheet, which polyolefin foam sheet forms the floor mat base, and then exposing the floor-protecting surface layer to a high-frequency field in such fashion that the plastic film of the floor-protecting surface layer is heated by the high-frequency field and the heat is transferred from the heated plastic film to the bonded polyolefin foam sheet which forms part of the floor-protecting surface layer, whereupon the surfaces of the polyolefin foam sheet of the floor-protecting surface layer or coating and the polyolefin foam sheet base of the floor mat are melted by the transferred heat and welded together to provide a composite floor mat having a polyolefin foam sheet base (which may be a single or multiple layered structure) and a floor-protecting surface layer, whereupon this floor mat is cut into appropriate segments by stamping and heated to a temperature of between 120° and 160° C. and then shaped by a vacuum to produce the desired form of the floor mat.

The bond between the floor-protecting surface layer and the floor mat base under the influence of a high-frequency field, is produced simultaneously with exposure to pressure, whereby the floor-protecting surface layer may be subjected to pressure either over its entire surface or only linearly, and is accordingly bonded to the floor mat. The process according to the invention for joining the floor-protecting surface layer to the floor mat base, therefore, provides for using, in the bonding area, a weldable foam, preferably chemically cross-linked polyethylene foam. The heat for melting and welding the foam is indirectly transferred and produced via the high frequency heating of a plastic film.

The primary directly heating of the plastic film of the floor-protecting surface layer is accomplished by using high frequency, and this heat is then transferred secondarily to the polyolefin foam layer being in associated contact therewith, and then further transferred through the polyolefin foam layer to the surface of the floor mat base, which is likewise made of polyolefin foam sheet, and by this heat transmission the foam layers are heated indirectly up to their melting temperature, whereupon the boundary layers become plastic and melt together. A homogeneous inseparable bond is produced in this way.

Preferably, a soft PVC film is used for the floor-protecting layer, said film being coated with an acrylic resin containing a hydroxyl group together with an isocyanate-based hardener, and then flame laminated with a cross-linked polyolefin foam sheet. Such a floor-protecting layer made of soft PVC and polyolefin foam, using an appropriate adhesion promoter, which cross-links under the influence of heat, offers the advantage that the bond of the floor-protecting surface layer is retained during exposure to high frequency and welding between the floor-protecting surface layer and the floor mat base.

To increase further the mechanical properties, a lattice-shaped or coarse mesh reinforcing insert can be placed between the floor-protecting surface layer and the floor mat base, especially a layer of glass fibers or polyester fibers, whereby the weld between the floor-protecting surface and the floor mat is accomplished through the mesh of the layer.

According to a further embodiment of the invention, it is possible to emboss the plastic film surface of the floor-protecting layer during exposure to the influence of the high-frequency field.

It is also possible, in order to increase and accelerate the high-frequency welding and the heat transfer between the floor-protecting surface layer and the floor mat base, to insert between the floor-protecting surface layer and the floor mat base, an auxiliary welding film, for example made of a melted adhesive or a mixed polymer film composed of an ethylene/vinyl acetate copolymer, which is also beatable by a high frequency field.

By virtue of the invention, it is possible to equip floor mats made of cross-linked polyolefin foams for lining interiors of motor vehicles with a floor-protecting surface made of plastic, preferably a PVC film or a pad, on the areas in the vicinity of the pedeals which are subject to considerable wear. This makes it possible to fit the passenger compartment of a motor vehicle uniformly with a mat shaped to fit it, including a permanently bonded floor-protecting surface layer. At the same time, the invention takes on the foam nature of the floor mat and permits permanent homogeneous bonds to be created between materials as dissimilar as plastic film, preferably PVC, in the floor-protecting surface layer and the cross-linked polyolefin foam composing the floor mat.

The invention is described in greater detail in the accompanying drawing with reference to the examples wherein:

FIGS. 1 and 2 show cross sections of segments of different floor mat construction;

FIG. 3 is a cross section to show the structure of the floor-protecting surface layer;

FIGS. 4 and 5 show partial cross sections of the floor mat of this invention which includes a floor mat base with a floor-protecting surface layer;

FIG. 6 shows a portion of a cross section through a shaped floor mat of this invention.

Figure 7:
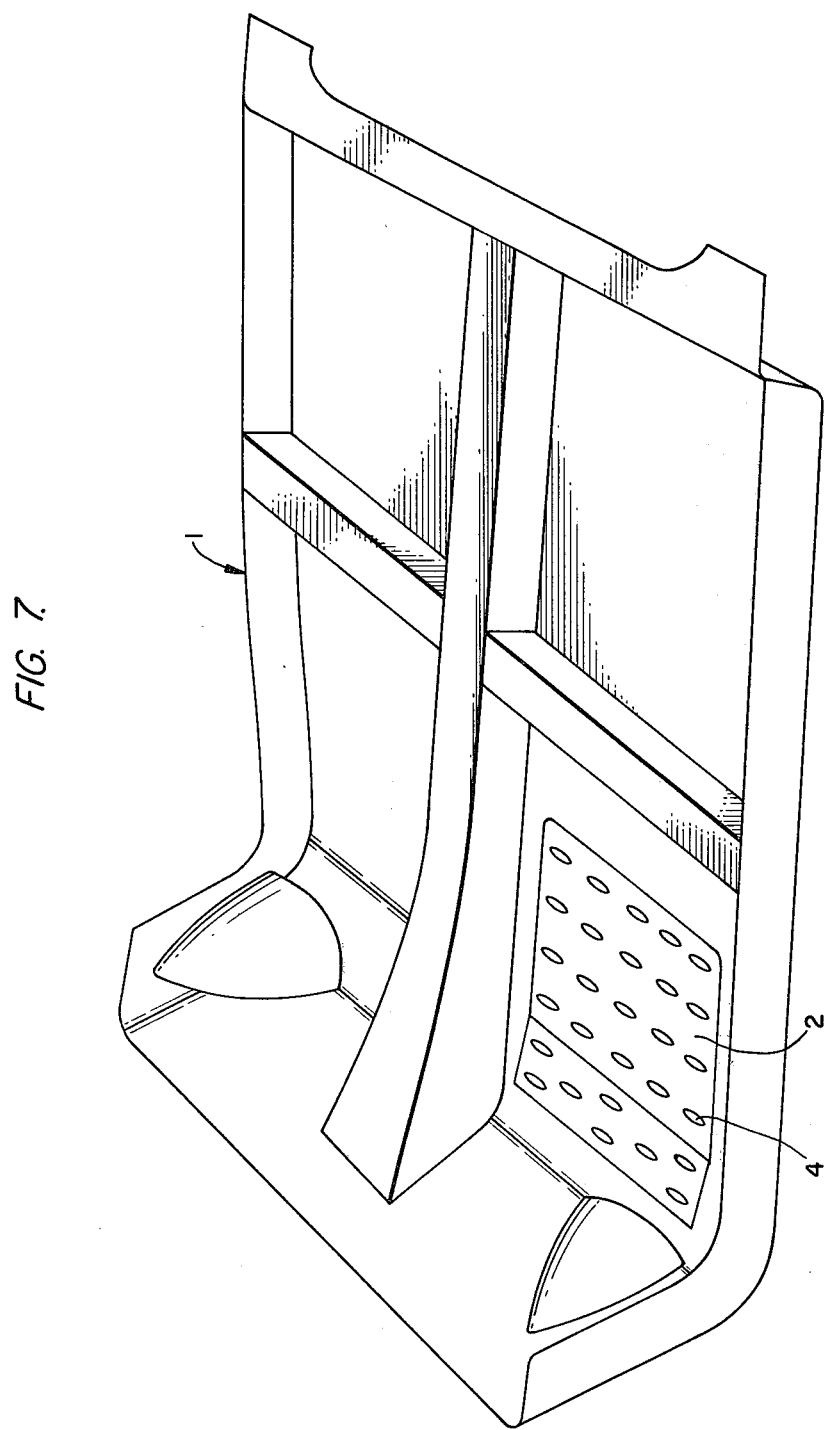
FIG. 7 is a perspective view of a floor mat of this invention provided with a floor-protecting surface layer for the passenger compartment of a motor vehicle.

Floor mats according to the invention are used primarily to line interiors, especially passenger compartments of motor vehicles or other transport modes, whereby the floor mats are provided with an abrasion-resistant, wear-resistant, preferably oil- and gasoline-resistant surface, and are provided additionally, at least partially, with a floor-protecting surface layer or coating, especially one made of a thermoplastic plastic such as PVC. The floor mat 1 shown in FIGS. 1 and 2 is preferably made of a chemically cross-linked polyethylene foam. If it is made in only one layer, a polyethylene sheet 10 with a density of 100 to 150 kg/m$^3$ and with a preferred thickness of 6 to 8 mm is preferred. After the polyethylene foam sheet 10 is shaped to provide the floor mat which forms the lining of the vehicle, the wall thickness decreases somewhat as a function of the local degree of deformation. FIG. 2 is a schematic diagram showing the two-layered structure of a floor mat 1 made of polyethylene foam sheets 11 and 12 with different densities. Polyethylene foam sheets 11 and 12 are preferably flame-laminated together, whereby the polyethylene foam sheet 11, with the higher density of preferably 150 to 200 kg/m$^3$, is used for the upper side exposed to wear, and the polyethylene foam sheet 12 with the much lower density of preferably 30 to 50 kg/m$^3$ is provided for the back side. With a preferred total thickness of the still unshaped floor mat of between 6 and 8 mm, a preferred thickness of 2 to 3 mm is provided for polyethylene foam sheet 11.

The floor-protecting layer 2, which serves to increase wear resistance and is applied on top of floor mat 1, is shown schematically in cross-section in FIG. 3. It consists of a thermoplastic plastic film or panel 21, suitable for floor protection, with a preferred thickness between 1 and 2 mm with a density which is not excessively great. The process of joining film 21 and polyolefin foam sheet 23 involves a combination of adhesive and flame-lamination, using a heat-activatable cross-linking adhesion promoter 22, which can withstand later high-frequency heating without separation phenomena. This combination is described in the heretofore mentioned allowed U.S. Patent Application Ser. No. 862,904. This floor-protecting surface layer 2 is preferably prefabricated as sheet goods, stamped out to the desired dimensions, then combined with floor mat 1 which serves as a base for the resulting floor mat having a floor-protected surface area.

FIGS. 4 and 5 are schematic representations of a floor mat 1 with floor-protecting surface layer 2 corresponding to the design of the floor mat in one or two layers as shown in FIGS. 1 and 2.

The floor-protecting surface layer is combined with the floor mat 1 by using high-frequency energy, whereby the permanent weld is effected by the heat transfer described hereinbelow.

Floor-protecting surface layer 2, as shown for example in FIG. 6, is placed loosely in the proper position on top of shaped floor mat 1 and then subjected to a high-frequency field. In this high-frequency field, film 21 made of soft PVC is heated because of the dipolar nature of the dielectric thermoplastic plastic, and heats very rapidly. This primary heat is transferred secondarily from film 21 to the polyethylene foam layer 23, which, like film 21, becomes plastic and thus melts the upper layer 11 or layer 10 of floor mat 1 made of polyolefin foam. The two polyolefin foam layers 23 and 11 or 10 then melt together, producing a homogeneous bond which can be broken only by destroying the polyolefin foam layers. The melting of the two layers produces a compact layer in the vicinity of the bond 3. In this process, under the influence of a high-frequency field, however, the adhesive bond between film 21 and polyethylene foam layer 23 is not broken, since the adhesion promoter 22 is already cross-linked. The entire process of bonding between the floor-protecting surface 2 and the floor mat 1 takes place in a so-called high-frequency press under the influence of pressure, whereby the high-frequency tool can be made so that during the bonding process, using film 21 which has been rendered plastic by heating, it can simultaneously emboss film 21 with a decorative pattern. Protective surface layer 2 can be joined to floor mat 1 either over the entire surface or only in linear fashion. However, preferably, the total surface bond is employed. It is also possible to provide in particular lattice-shaped reinforcing inserts between the floor mat and the floor-protecting surface layer, such as woven fiberglass layers, which produce an additional improvement of floor protection and in particular prevent later stretching of the surface under the influence of pressure.

Another important feature of the invention is that the foam structure of the floor mat is largely retained in the vicinity of the bonding area 3 in the vicinity of the weld by the secondary heating, which acts only superficially.

Working Example

For a floor mat with a partially floor protecting surface, an example for a motorcar like Ford Escort is shown in FIG. 7. There is needed for the base floor mat a chemically crosslinked polyethylene foam sheet gross: length 1,8 m×2,2 m with ×7 mm thick with a density of 130 kg/m$^3$ in color black. This foam sheet is heated by IR up to 160° C. and then shaped by vacuum moulding in to the shape as shown in FIG. 7, an outstanding rim is being cut away. In a next separate step a chemically crosslinked polyethylene foam sheet with a density of 70 kg/m$^3$, thickness of 2 mm is flame laminated by temperatures higher than 300° C. with a soft PVC-foil, containing about 30 to 35 weight percent plasticizer, like diotylphthalat, with a thickness of 1,5 mm whereby the soft PVC-foil has been coated and dried with an acrylic resin containing hydroxy groups, i.e. "PARALOID OL-42" by Rohm a. Haas USA, xylene and ethyl glycol acetate and isocyanate curing agent. The combined protecting surface layer consisting of the soft PVC-foil and the chemically crosslinked polyethylene foam sheet is cut into pieces of 400 mm length to 500 mm with, f.ex. Then the protecting surface layer is brought into welding position on the press plate of a high frequency welding equipment and then the flooring base mat is brought into the corresponding position vis a vis of the protecting layer. Thereafter the press plate with the protecting layer is put down onto the flooring base mat and high frequency with an energy of 12 kw for a time of 30 sec. is applied and the protecting layer is bonded by melt welding of the polyethylene foam to the base floor mat.

What is claimed is:

1. A floor mat comprised of cross-linked polyolefin foam for the lining of the floor interiors of motor vehicles, which comprises a cross-linked polyolefin foam floor mat base having at least one preselected surface area covered with a permanently applied floor-protecting surface layer comprised of a cross-linked polyolefin foam layer made of the same polyolefin as the polyolefin forming said polyolefin foam floor mat base and a thermoplastic polymeric film which is heatable in a high-frequency electrical field in dielectric fashion and which exhibits wear resistance superior to the cross-linked polyolefin foam layer and the foam floor mat base, said thermoplastic polymeric film being a film of a polymeric material with a dielectric constant of 2.5 to 6 and a dielectric loss factor greater than $1.5 \times 10^{-3}$ and being formed of a polymer selected from the group consisting of polyvinylchloride, a soft polyvinylchloride, an ABS polymer, an ethylene copoloymer and a polyamide; said polymeric film and the polyolefin foam layer being bonded together to form said floor-protective surface layer by an adhesion promoter which is cross-linkable under the influence of heat and the polyolefin foam layer of the floor protecting surface layer being in contact with and bonded to an upper surface of the floor mat base, with the upper surface of the floor mat base and the polyolefin foam layer being melted and being homogeneously welded together by heat generated by the application of a high-frequency electrical field to the polymeric film; said cross-linked polyolefin foam floor mat base being preshaped to conform to the contours of the floor interior of a motor vehicle.

2. A floor mat according to claim 1, wherein the base and the foam layer each is a chemically cross-linked polyethylene foam.

3. A floor mat according to claim 1, wherein the adhesion promoter is the reaction product of an acrylic resin containing hydroxyl groups and an isocyanate hardener.

4. A floor mat according to claim 1, wherein the floor-protecting surface layer is made of a soft PVC film, which is flame-laminated and bonded with a chemically cross-linked polyethylene foam layer by using an acrylic resin containing hydroxyl groups and a hardener based on isocyanate.

5. A floor mat according to claim 1, wherein the floor mat base is made of a polyolefin foam sheet under the influence of pressure and heat.

6. A floor mat according to claim 1, wherein a lattice-shaped or coarse mesh reinforcing insert made of glass fibers or polyester fibers is provided between the floor mat base and the floor-protecting surface layer.

7. A floor mat according to claim 1, wherein the floor mat base is made of a chemically cross-linked polyethylene foam sheet with a density of 100 to 150 kg/m$^3$ and a thickness of 5 to 10 mm.

8. A floor mat according to claim 1, wherein the floor mat base is made of two sheets of chemically cross-linked polyethylene foam, said sheets being joined flush together, whereby the polyethylene foam sheet that forms the side exposed to wear has a density of 150 to 200 kg/m$^3$ and a thickness of 2 to 5 mm, and the polyethylene foam sheet that forms the back side has a density of 30 to 70 kg/m$^3$ and a thickness of 4 to 10 mm.

9. A floor mat according to claim 1, further comprising an auxiliary welding film heatable by high frequency, made of a melted adhesive or an ethylene-vinyl acetate copolymer film with an acetate content of 8 to 60% provided between the floor mat base and the floor-protecting layer.

10. a floor mat according to claim 1, wherein the polyolefin foam layer for the floor-protecting surface layer has a density of 70 to 100 kg/m$^3$ and a thickness of 2 to 5 mm.

11. A floor mat according to claim 1, wherein the polyolefin foam layer has a density lower than the foam floor mat base.

* * * * *